United States Patent [19]

Overbury

[11] 4,365,416

[45] Dec. 28, 1982

[54] CHAIN SAW HANDLE, GUARD AND HOUSING INTERCONNECT

[75] Inventor: Douglas G. Overbury, Brockville, Canada

[73] Assignee: Black & Decker Inc., Newark, Del.

[21] Appl. No.: 251,720

[22] Filed: Nov. 18, 1980

[51] Int. Cl.[3] .............................................. B23D 57/02

[52] U.S. Cl. ........................................ 30/382; 30/295; 403/287

[58] Field of Search .................................. 30/381-387, 30/340, 344, 295; 403/287

[56] References Cited

U.S. PATENT DOCUMENTS

| | | | |
|---|---|---|---|
| 2,370,556 | 2/1945 | Mall | 30/386 |
| 3,728,793 | 4/1973 | Makinson et al. | 30/383 |
| 3,857,179 | 12/1974 | Haupt et al. | 30/381 |
| 4,059,895 | 11/1977 | Hirschkoff | 30/382 |
| 4,240,762 | 12/1980 | Lobanoff | 403/287 X |

FOREIGN PATENT DOCUMENTS

| | | | |
|---|---|---|---|
| 27734 | of 1911 | United Kingdom | 30/344 |

*Primary Examiner*—Frank T. Yost
*Attorney, Agent, or Firm*—Harold Weinstein; Edward D. Murphy; Walter Ottesen

[57] ABSTRACT

A joint formed by interconnecting a frame, a handle and a handguard with a single fastener. The members are interlocked to each other to transfer any torque created by a force applied to the housing of the chain saw or one or more of the interconnected members. The handle and the handguard each have slabbed sides which coact to produce a wedge-like locking action therebetween.

14 Claims, 10 Drawing Figures

FIG. 5
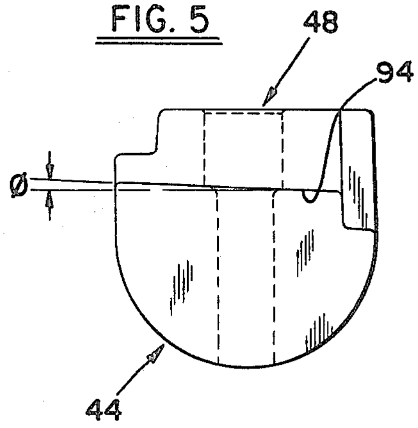
FIG. 6
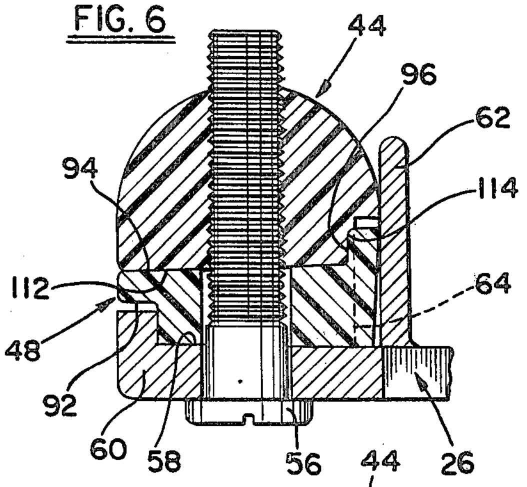
FIG. 7
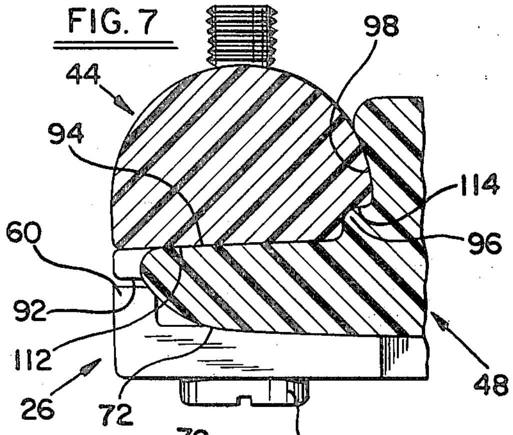
FIG. 8
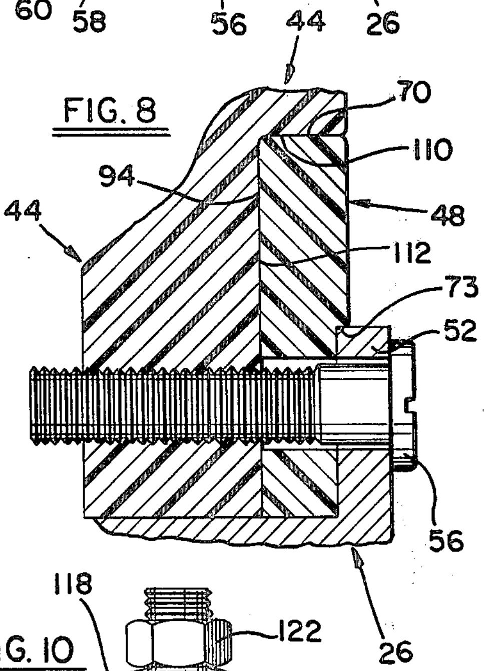
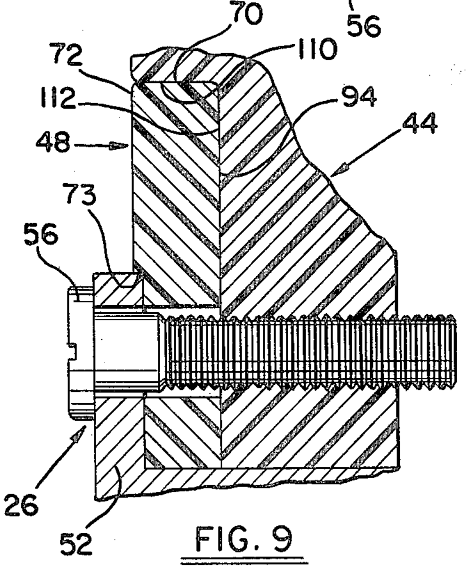
FIG. 9
FIG. 10
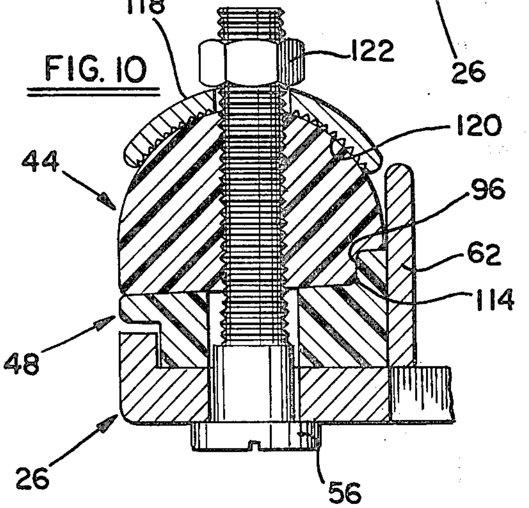

CHAIN SAW HANDLE, GUARD AND HOUSING INTERCONNECT

BACKGROUND OF THE INVENTION

Heretofore joint members of the prior art were connected in pairs or more than one fastener was used to complete the joint if there were more than two members. Either way, other conventional joint connections were expensive, complex and time consuming in assembly, to say nothing of the relatively unsightly joint which resulted.

SUMMARY OF THE INVENTION

It is an object of the present invention to provide an improved chain saw handle, guard and housing interconnect which avoids the prior art disadvantages; which is simple, reliable and economical; which has three interfitted members; which outer members have at least three active surfaces and an inner member coacting with the outer members; which has two members connected to the housing and the members are wedge-locked to each other; which joint is enclosed by a cover; and which joint is assembled by a single fastener means.

Other objects and advantages will be apparent from the following description of the invention, and the novel features will be particularly pointed out hereinafter in the claims.

BRIEF DESCRIPTION OF THE DRAWINGS

This invention is illustrated in the accompanying drawings in which:

FIG. 5 is an enlarged bottom view of handle and handguard interlocking interconnection showing the angle of the interface therebetween.

FIG. 6 is an enlarged partial sectional plan view taken along line 6—6 of FIG. 2.

FIG. 7 is an enlarged partial sectional plan view taken along line 7—7 of FIG. 2.

FIG. 8 is an enlarged partial sectional elevational view taken along line 8—8 of FIG. 2.

FIG. 9 is an enlarged partial sectional elevational view taken along line 9—9 of FIG. 2.

FIG. 10 is an enlarged partial sectional plan view showing another embodiment of the present invention in the same view as that shown in FIG. 6.

DESCRIPTION OF THE INVENTION

Figure 1:
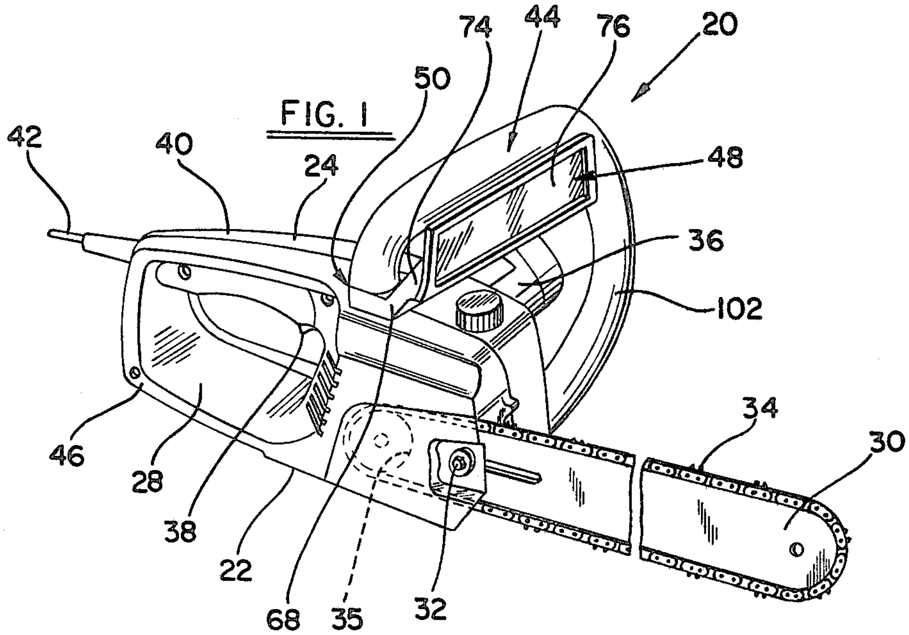
FIG. 1 is a perspective view of the chain saw embodying the present invention.

A portable power driven chain saw designated generally 20 is shown in FIG. 1 and embodies the present invention. The chain saw 20 has a housing 22 of clam-shell construction in which there is a support portion 24 to which a frame or bracket 26 (see FIG. 2) and other operative components are affixed, and a cover portion 28. A guide bar 30 extends forwardly from the housing 22 and is affixed thereto by a fastener 32. An endless saw chain 34 is entrained on the guide bar 30 to be driven by a sprocket 35 powered from a suitable motive means as, for example, an electric motor (not shown) housed in a motor casing 36. The motor is energized by a trigger switch 38 mounted in a rear handle 40 and connected to a source of electricity by an electric cord 42.

Figure 2:
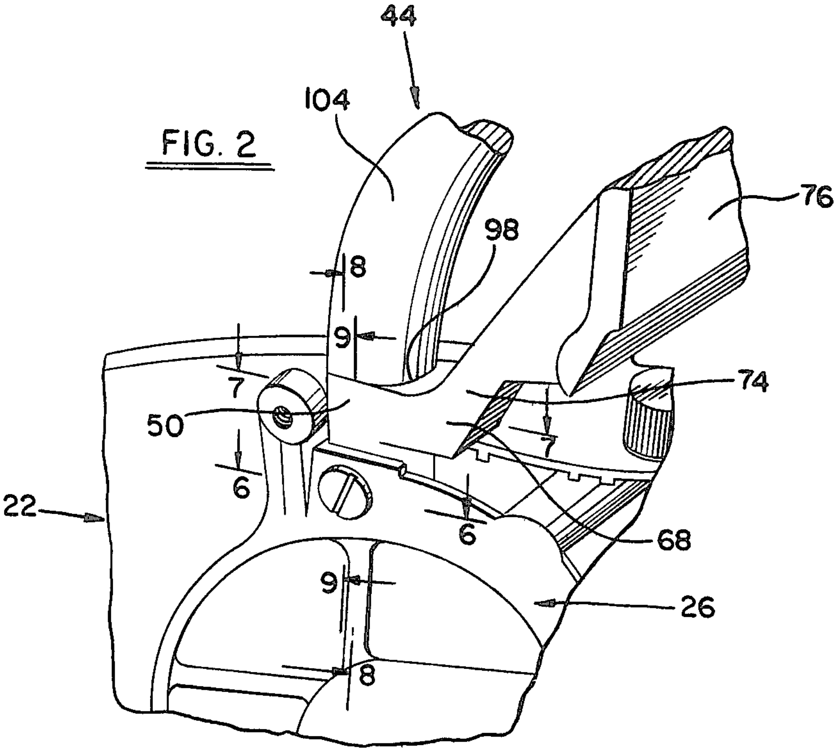
FIG. 2 is an enlarged partial perspective view showing the FIG. 1 improved handle, handguard and frame connection of the present invention, with the housing cover removed.

The housing 22 shown in FIGS. 1 and 2 has a top handle 44 which is disposed transversely across and wraps around the housing 22 on the motor casing 36 thereof. The chain saw 20 may be conveniently and easily controlled during operation by the operator grasping the rear handle 40 with one hand and the top handle 44 with the other hand. The handle 40 shown in FIG. 1 is enclosed and widened at the bottom thereof by a lower portion 46 which protects the operator's hand from beneath.

A transverse handguard 48 illustrated in FIGS. 1 through 4 extends from an interlocked interconnection with the frame 26 and handle 44 as described more fully hereinafter, and defines a three-member joint, designated generally as 50.

The stresses and forces placed on the joint 50 will be most severe during operation of the chain saw 20 and will result from various push-pull or rotary motions of the chain saw 20, the handle 44 or the handguard 48.

Figure 3:
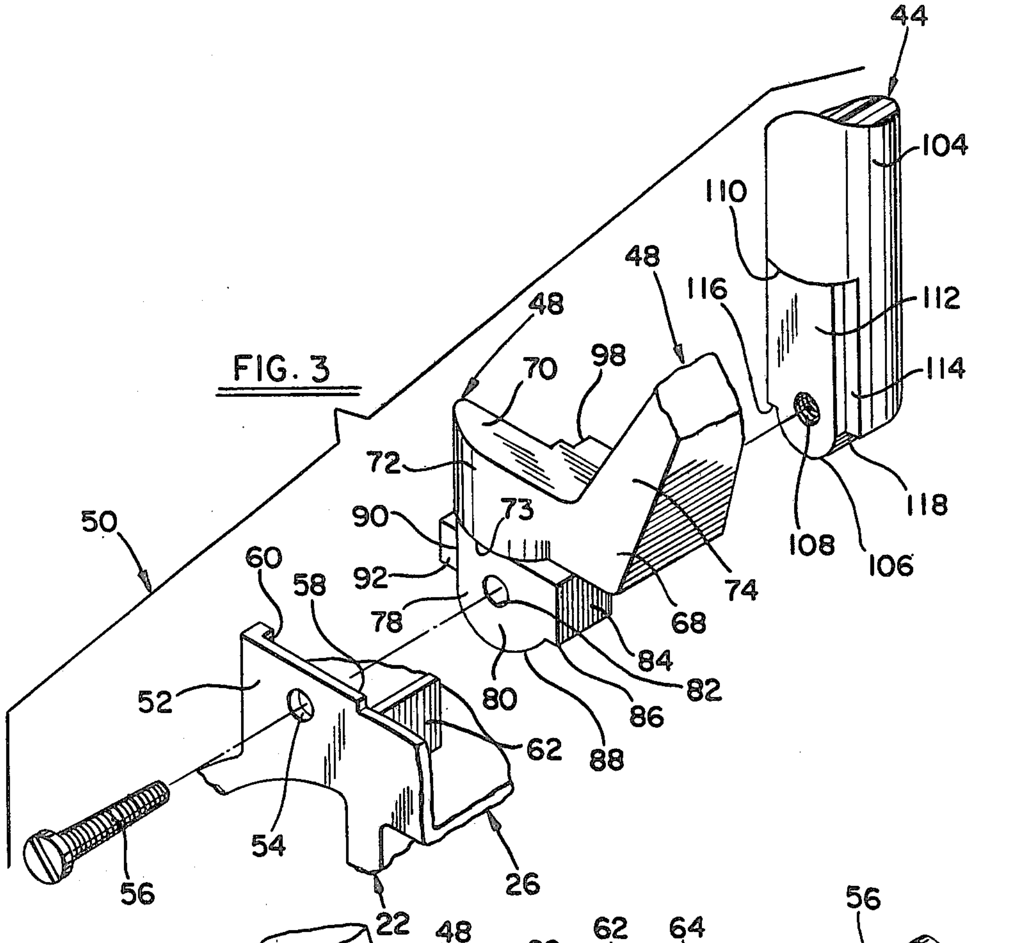
FIG. 3 is an enlarged exploded partial perspective view of the improved handle, handguard and frame with fastener in the FIG. 2 configuration of the present invention.
Figure 4:
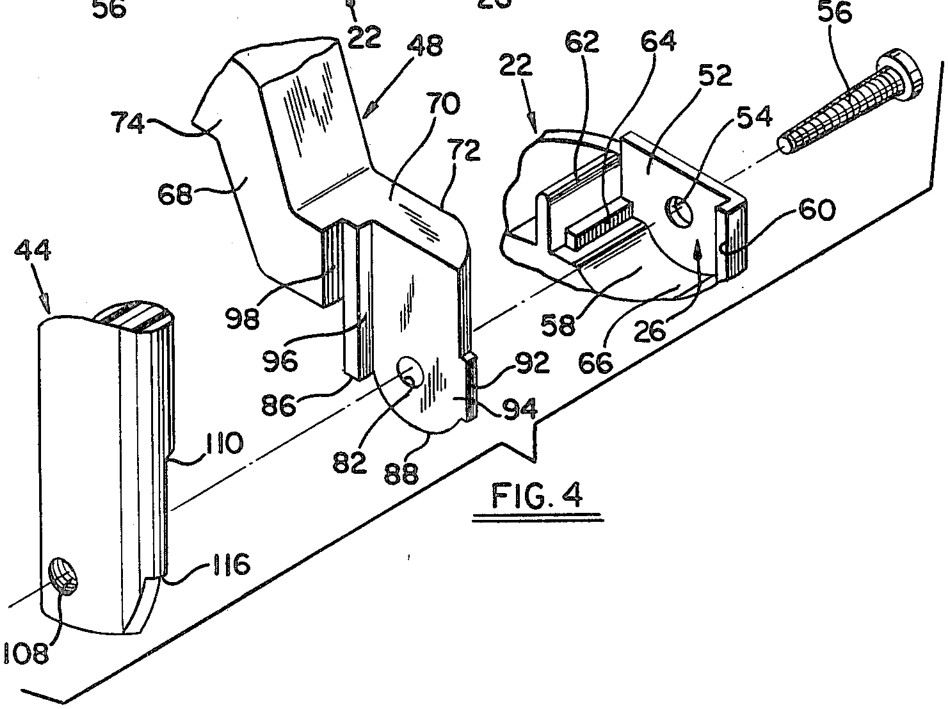
FIG. 4 is an enlarged exploded partial perspective view of the improved handle, handguard and frame with fastener of the present invention as viewed from the opposite side as that shown in FIG. 2.

The frame or bracket 26 is formed integrally with the housing 22 and is best seen in FIGS. 2, 3 and 4. The outboard side has a short vertical wall 52 and an aperture 54 which receives a fastener 56 therethrough, with the frame 26 and fastener 56 being hidden in assembled position by the cover 28 of the housing 22 as shown in FIG. 1. A channel 58 is formed on the inboard side opposite the wall 52. A short vevtical rear flange 60 bounds one end of the channel 58, while a raised elongated ledge 62 runs the thickness of the frame 26 and has a shorter step ledge 64 facing the flange 60 formed at its base 66 which base is curved between the ledge 64 and the flange 60. The frame 26 functions to provide contact surfaces which will prevent rotation and provide torque transfer. It is apparent that the frame 26 has at least three contact surfaces.

The handguard 48 or, more simply, the guard 48 has a flat substantially straightforward projection 68 having a flat top 70 and a curved outboard side 72, with a bottom shoulder 73 terminating at the lower section 78, and with the projection 68 angled at section 74 forwardly and upwardly into a transverse enlarged guard plate 76 that extends forwardly of and parallel to the top section of the handle 44 as shown in FIGS. 1 and 2. Below the curved side 72 of the forward projection 68 is a lower section 78 having a flat outboard side 80 with an aperture 82 therethrough aligned with aperture 54 of the frame 26. The front of the lower portion is a square contact surface 84. The underside is a short shoulder 86. The bottom 88 of the lower section 78 is curved, with the rear being recessed at 90 to form a flange 92. The inboard side of guard 48 has a sloped slab 94 extending from base 88 to top 70 to terminate in a step flange 96 the bottom of which includes the shoulder 86. A short arcuate transverse arm 98 completes the back portion of the forward projection 68. As best seen in FIG. 5, the slab 94 is sloped at a suitable angle which in the preferred embodiment is within the range of 2° to 45° so as to assure the proper wedge-like action between the contact surfaces. The side 80 will engage the inboard side of the wall 52; thus placing the recess 90 into engagement with the flange 60 as shown in FIG. 6, and also engaging the contact surfaces 84 and 86, respectively, with the ledges 62 and 64.

The handle 44 shown in FIGS. 1 through 4 has a top section 100 which loops at 102 about and forwardly of the motor casing 36 to connect at the bottom of the housing 22, while the other end thereof turns downwardly in a vertical section 104 which terminates in a curved base 106 having an aperture 108 spaced therefrom in alignment with the apertures 54 and 82. A shoulder 110 is formed downwardly facing in spaced relation to the base 106. The shoulder 110 terminates in a slabbed side 112 corresponding to the slab 94 of the guard 48. A recess 114 is formed at the forward end of the slab 112. A pair of spaced short shoulders 116 and 118 are formed at the rear and front of the base 106.

The handle 44 has a circular cross section which the guard 48 matches at the curved side 72 shown in FIGS. 3 and 7, and the curved arm 98 shown in FIGS. 2, 4 and 7. The slabbed sides 94 and 112 have corresponding slopes to provide contacting surfaces that will produce wedge-like action therebetween, with the slabs 94 and 112 being shown in FIGS. 6 and 7, wherein the step flange 96 fits within the recess 114.

The top 70 is shown nested to the shoulder 110 in FIGS. 8 and 9, and the shoulder 73 rests upon the upper edge of the wall 52.

The ledge shown in FIGS. 4 and 6 extends under, and in engagement with, the shoulders 86 and 118, while the ledge 62 contacts the surface 84 and the forward side of the lower section 104 adjacent the recess 114.

The handle 44 has at least three contact surfaces, while the guard 48 has at least three contact surfaces to engage each of the frame 26 and handle 44. The fastener 56 has suitable threads which may be self-tapping or otherwise as shown in FIGS. 3, 4 and 6. The fastener 56 is disposed from the outboard side of the frame 26 through the aligned apertures 54 and 82 to be self-tapped within the aperture 108. The fastener 56 completes the assembly of joint 50 so as to interconnect and wedge-lock the three members 26, 44 and 48, respectively, so as to provide the contact and torque transfer surfaces therebetween which number at least three per member.

Another fastener 116 of a second embodiment is shown in FIG. 10 wherein the same interconnected, interlocked members are shown. A curved washer 118 having locking teeth 120 engages the outer surface of the handle 44 to be tightened into place by a nut 122 threadedly received upon the fastener 116 so as to provide an independent connector for the fastener 116 which completes the assembly of the joint 50.

Acccordingly, when a force is applied, one or more of the three members 26, 44 or 48 will interact with the other members along or upon the contact surfaces, ledges, shoulders or recesses so as to transfer the torque therebetween and distribute and dissipate said force.

It will be understood that various changes in the details, materials, arrangements of parts and operating conditions which have been herein described and illustrated in order to explain the nature of the invention may be made by those skilled in the art within the principles and scope of the invention.

Having thus set forth the nature of the invention what is claimed herein is:

1. A housing for a chain saw in which a motive means is mounted to power a saw chain, the housing comprising:
(a) a frame,
(b) a handle projecting from the frame at one end,
(c) a handguard projecting from the frame at one end and having a portion thereof in spaced relationship to the handle,
(d) the handle having an other end thereof slabbed,
(e) the handguard having an other end thereof slabbed to interlock with the slabbed end of the handle, and
(f) fastener means interlocking the slabbed ends of the handle and handguard to the frame to form a rigid connection therewith.

2. The combination claimed in claim 1 wherein:
(a) a channel formed in the frame,
(b) a handguard fitted within the channel, and
(c) the slabbed ends of the handle and the handguard sloped to form a coacting wedge.

3. The combination claimed in claim 2 wherein:
(a) aligned holes formed in each of the frame, the handle and the handguard through which the fastener means extends.

4. The combination claimed in claim 3 wherein:
(a) the fastener means extends through the frame and the handguard to be connected to the handle.

5. The combination claimed in claim 4 wherein:
(a) the fastener means including a screw and nut, and
(b) the screw passing through the frame, handguard and handle threadedly to engage the nut and connect the components to each other.

6. A three-member joint for a housing of a chain saw comprising:
(a) a bracket formed on the housing defining a first member,
(b) a second member having an upper projection extending outwardly from the joint,
(c) a third member defining a handle,
(d) the first and the third members each having three active contact surfaces, thereon,
(e) the first and the third members being spaced from each other, with the second member therebetween in interfitting relationship therewith,
(f) the second member having three active surfaces on each side thereof compatible with and separately to coact with each of the surfaces of the respective first and third members,
(g) aligned holes formed in each of the three members,
(h) a fastener extending through the first member clampingly to interconnect each of the members to form the joint, and
(i) a cover connected to the housing to hide the fastener thereunder.

7. The combination claimed in claim 6 wherein:
(a) a channel formed in the bracket,
(b) a ledge formed on one side of the channel,
(c) a flange formed on the other side of the channel,
(d) a recess formed on the handguard to interfit with the bracket flange, and
(e) a flat surface formed on the handguard to rest upon the bracket ledge.

8. The combination claimed in claim 7 wherein:
(a) a pair of ledges formed on the bracket, and
(b) a pair of flat surfaces formed perpendicularly on the handguard to coact with the pairs of bracket ledges.

9. The combination claimed in claim 8 wherein:
(a) sloped surfaces mating on the handguard and the handle to coact in wedge-like fashion for the joint.

10. The combination claimed in claim 9 wherein:
(a) the upper projection having a portion thereof which wraps around the adjacent part of the handle.

11. A three-member joint for a housing of a chain saw comprising:
(a) a bracket being one of the members,
(b) a channel formed in the bracket,
(c) a second member disposed in the channel engaging the bracket,
(d) the second member having a sloped slabbed side remote from the bracket,
(e) a third member having a sloped slabbed side facing the bracket and coacting with the corresponding sloped slabbed side of the second member,
(f) a shoulder formed on one of the second or third members,
(g) a top surface engageable with the shoulder from which the other of the second or third members extends outwardly from the joint in a direction away from the housing,
(h) a recess and a flange interconnected to each other and formed on the second and third members whereby each of the successive members has three active surfaces coacting with three surfaces of the adjacent member,
(i) aligned holes formed in each of the three members, and
(j) a fastener disposed through the aligned holes to interconnect said members into an assembled joint.

12. The combination claimed in claim 11 in which the chain saw has a sprocket driven saw chain wherein:
(a) the three-member joint disposed in superposition to the sprocket whereby the chain saw and handle is balanced.

13. The combination claimed in claim 12 wherein:
(a) the fastener extends through the bracket first, and is connected to the third member.

14. The combination claimed in claim 13 wherein:
(a) a cover connected to the housing to hide the fastener and joint thereunder.

* * * * *